June 26, 1962 V. STELLA 3,041,196

WEAR RESISTANT TREATMENT OF SOUND- AND IMAGE-REPRODUCING TAPE

Filed March 20, 1958

2 Sheets-Sheet 1

INVENTOR.
VIRGINIO STELLA
BY Robert K. Jacob
AGT

WEAR RESISTANT TREATMENT OF SOUND- AND IMAGE-REPRODUCING TAPE

Filed March 20, 1958

INVENTOR
VIRGINIO STELLA
BY Robert H. Jacob
AGENT 3,041,196

WEAR RESISTANT TREATMENT OF SOUND- AND IMAGE-REPRODUCING TAPE

Virginio Stella, Rome, Italy, assignor to Cinechimica, Rome Italy, a company of Italy Filed Mar. 20, 1958, Ser. No. 722,793
Claims priority, application Italy Mar. 22, 1957
2 Claims. (Cl. 117—43)

It is known in cinematographic systems and the like to use thin tapes made of plastic materials generally cellulose esters, perforated or otherwise and provided on one or both faces with a very thin coat of colloidal material, usually gelatine, containing halides of silver and other substances in a state of extreme dispersion.

With suitable equipment and systems already known it is possible to record on these tapes motion pictures in black and white or in colour and sounds which, with suitable equipment and systems, also known, can be reproduced or made sensitive to several people.

For the simple reproduction of sounds and, in some cases, of the images as well, use is also made of thin tape made of the same plastic material and uniformly coated with a very thin layer of a colloidal mix containing magnetic material in a state of extreme sub-division: on this tape, owing to the magnetic properties of the material and by the use of known equipment it is possible to record sounds or images which, with other suitable known equipment can be reproduced or made perceivable to several people for cinematographic or television purposes or otherwise.

In all the cases mentioned the tape must slide in the equipment with which it is used in the easiest possible manner, avoiding friction which might damage either the tape or the parts of equipment in contact therewith and this is obtained in various manners.

In practice, however, it is not possible to avoid that after a certain number of passages through the equipment the said tape should become damaged so that in time it is no longer usable; also, the parts of the equipment which are subjected to the friction of the tape must be replaced after a certain time, a requirement which is particularly onerous in cinematographic and television equipment using the magnetic recording equipment.

It is an object of the invention to provide a method capable of reducing friction between the tape and the cooperating parts of the equipment with which it may be used and in consequence considerably prolonging the life of the tape and of the parts of the equipment subjected to such wear.

In the case of cinematographic films, methods directed to achieving this object are known in which the edge of the film, especially on the side of the photographic image (where the friction is greatest), is coated with waxy substances or resins which can act as solid lubricants for the purpose of reducing friction between the sliding parts.

The success of these known methods, as confirmed in practice, is very short-lived because owing to the three dimensional development which the crystalline particles of the waxes and resins readily exhibit when they age, such waxes and resins cannot be anchored in a permanent manner to the gelatinous layer containing the image and their rapid aging (which produces crystalline growth) makes the protective layer fragile and flaky so that a result opposite to the one desired is obtained; for the same reason such known methods cannot be applied and indeed are not applied to the other side of the film which only serves as a support or backing.

On the other hand, in the case of tape for the magnetic reproduction of sound only or for the magnetic reproduction of images, no similar method is known.

The method which is the object of this invention can be applied indiscriminately to tape for reproducing images and sound in whatever form on both sides of said tape.

It has been found that if instead of using, as in the above mentioned known arrangements, solid lubricants consisting of initially two-dimensional crystalline particles of organic substances, use is made of solid lubricants consisting of two-dimensional crystalline particles of mineral substances, as for example graphite and molybdenum bisulphide suitably distributed on the relevant parts of the tape, the considerable reduction in the sliding friction which is noted is of a nearly permanent nature because the ageing or, in other words, the crystal growth of the mineral substances along the third dimension which may be due to heat or other causes is practically negligible.

The use of solid lubricants of this nature is of invaluable service in many known mechanical applications and especially when rolling or sliding friction is involved with or without compression, but they have never been used in the manner hereinafter specified as regards such applications. The said mineral two-dimensional solid lubricants may be obtained in a colloidal state with mixes of extremely small dimensions which may be suspended in various vehicles such as alcohol, petrol, toluene, water and so on; these methods for obtaining the said lubricants facilitate their application in accordance with the invention, but they are not essential thereto.

According to the present invention, a colloidal suspension of a mineral two-dimensional solid lubricant is distributed in a continuous and uniform manner on the parts of the tape which are to be protected against wear.

The invention also provides a tape for the reproduction of sound and images which is at least partly coated with a layer of a mineral two-dimensional solid lubricant attached to the tape in a permanent manner.

FIGS. 1 to 8 of the drawings show cinematographic films of various gauges in current use, to which lubricant is applied in accordance with the invention, the parts to which the lubricant is applied being represented by longitudinal shading lines, while the nitrocellulose layers are shown in white, the gelatine layers by dotted lines, the supports in broken lines and the layers of magnetic material in section lining.

More particularly FIGS. 1, 2 show in plan, front or image side and back or support side and FIG. 3 a section of a 35 mm. cinematographic film; FIGS. 4, 5 and 6 are similar views for a 16 mm. cinematographic film; and FIGS. 7 and 8 show the plan and section respectively of a 35 mm. magnetic tape. In the interests of clarity the sections have not been reproduced to scale; in particular the thickness of the film is shown on a greatly enlarged scale.

It is naturally important that the suspension should be distributed so as to be limited exclusively to the part of the strip which must be protected.

After the suspension has been distributed, the strip is run continuously in a drier, in order to dry up the suspension and to form a protective layer of a mineral solid lubricant.

From the point of view of the success of the method it is essential:

(1) That the layer should be firmly secured to the material on which it is distributed; and (2) That its thickness should be uniform and very small.

The simple use of a colloidal suspension of the said mineral two-dimensional lubricants in the usual liquid vehicles after which they are obtained or supplied commercially never gives the expected results.

It has now been found according to this invention that a permanent anchorage of the lubricant and its uniform distribution in a very thin layer can be obtained quite independently of the mechanical system adopted for the distribution of the suspension, when the liquid vehicle of the colloidal suspension has no dissolving effect on the material on which the lubricant has to be distributed, but only a simple swelling or blowing out effect; the blowing out of the material allows the lubricant mix to spread and to run in a regular and uniform manner, thus making it easier to attain the second essential above referred to and realizing without exception the first essential after the drying operation.

The foregoing is directly applicable in the majority of practical cases and in particular for the purpose of obtaining protective layers of the mineral solid lubricant on the back or supporting side of cinematographic films and tape for the magnetic recording of sounds or images on the side containing the magnetic coating.

In some cases it may be difficult to achieve the desired results because it is not always possible to obtain vehicles for the mineral two dimensional lubricant suspension in which the swelling or blowing out properties of the material carrying the lubricant are of the required order.

This applies for instance to the case of the obverse or image side of cinematographic films where the material on which the lubricant is to be spread consists of animal gelatine.

It has been found, and it is another feature of this invention, that in this general case the required results may be obtained by spreading first on the material an intermediate layer of a suitable colloid suspended in a vehicle having definite swelling or blowing out properties as regards that material, and then, by spreading on the layer thus obtained when it is dry, the mineral two-dimensional lubricant in a vehicle having definite swelling or blowing out properties as regards the colloid forming the intermediate layer.

In the particular case of the obverse or image side of cinematographic films the intermediate layer would consist of cellulose esters.

*Examples*

(1) For spreading a protective layer of a mineral two-dimensional solid lubricant on the reverse or supporting side of a cinematographic film of the nitrate of cellulose type, the following solid solution can be used:

| | | |
|---|---|---|
| Colloidal graphite | gr. | 10 |
| Methyl alcohol | cc. | 60 |
| Ethyl acetate | cc. | 10 |
| Amyl acetate | cc. | 10 |
| Ethyl chlorhydrine | cc. | 20 |

(2) To provide a coating having similar results, on the reverse or supporting side of a cellulose acetate or cellulose aceto-butyrate film, the following solution is used:

| | | |
|---|---|---|
| Colloidal graphite | gr. | 10 |
| Methyl alcohol | cc. | 60 |
| Ethyl chlorhydrine | cc. | 10 |
| Tetrachlorethane | cc. | 30 |

(3) To provide a protective layer on the obverse or gelatine side of a black and white or colour cinamatographic film, a cololidal solution as follows is first distributed on the gelatine:

| | | |
|---|---|---|
| Nitrocellulose | gr. | 7 |
| Methyl alcohol | cc. | 30 |
| Ethyl acetate | cc. | 30 |
| Amyl acetate | cc. | 5 |
| Ethyl lactate | cc. | 10 |
| Butyl phthalate | cc. | 3 |
| Butylic alcohol | cc. | 8 |
| Toluene | cc. | 15 |

When the ester colloidal solution has been spread to provide a suitable layer, and the layer dried, it may be covered with a layer of the solution given in Example 1.

(4) For spreading, with similar results, on the side containing the magnetic material of a tape for magnetically recording sound and images, the following solution is used:

| | | |
|---|---|---|
| Colloidal graphite | gr. | 8 |
| Methyl alcohol | cc. | 40 |
| Cyclohexanol | cc. | 10 |
| Light rectified benzene | cc. | 50 |

It is emphasized that by use of the liquid vehicles described above for applying a lubricant on a film the liquid has no definite solvent action of the material forming the film but only a definite buffering or blowing out action on the material. The action of the buffering agent is most important because if the mixture contains only solvent agents, the film is injured to the extent of weakening it beyond a tolerable limit, whereas the buffering agent only softens the film to adhere the lubricant to it without dissolving the film.

In the examples above the protective layer on the reverse or backing side of the cinematographic film based on the cellulose nitrate is obtained by using nitrate solvents contained in an ethyl chlorhydrine vehicle as a stoppering or buffering agent. The protective layer on the reverse or backing side of the cinematographic film based on cellulose ester other than nitrate is obtained by using ester solvent contained in an ethyl chlorhydrine and tetrachlorethane vehicle as a stoppering or buffering agent.

Figures 1, 2:
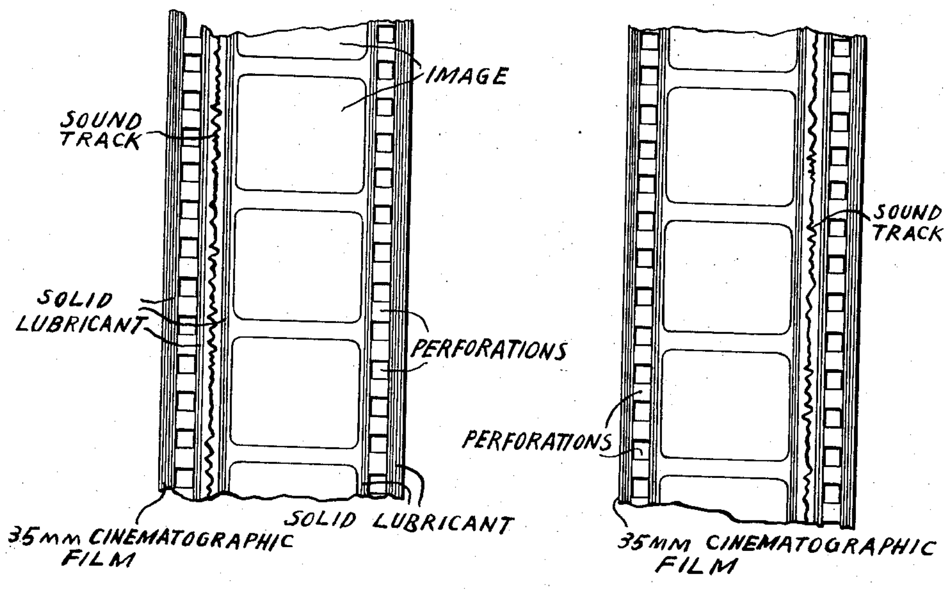
Figure 3:
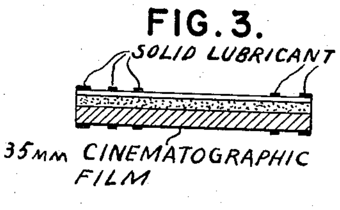
Figures 4, 5:
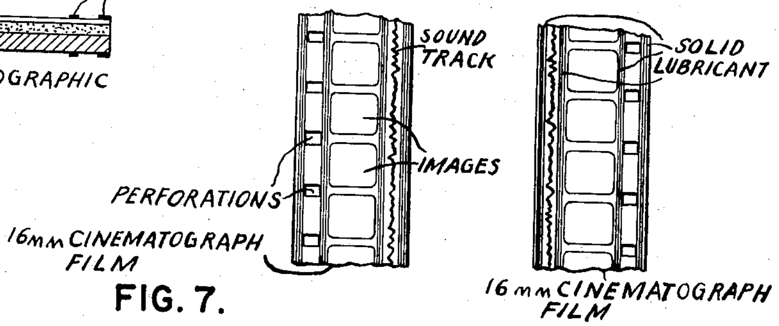
Figure 6:
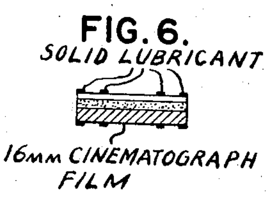
Figures 7, 8:
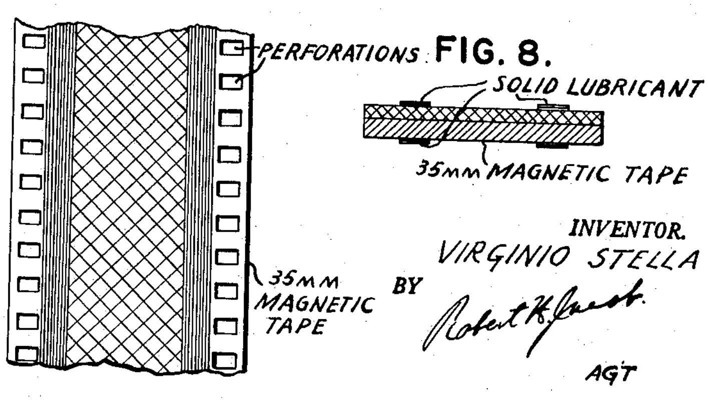
Figure 9:
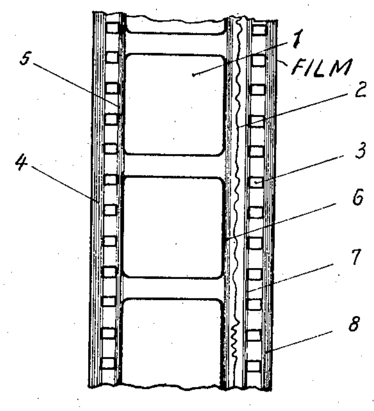
FIG. 9 shows a plan of part of a cinematographic film after being treated according to this invention.

In FIG. 9, there is shown a film carrying in the usual way the images 1 and the sound track 2. The two edges of the film have the usual perforations 3 for moving the film. It is to be noted that both the type of images and the gauge of the perforations have been chosen in a complete arbitrary manner, for reasons of simplicity of representation and as such are unlike those of actual commerical films. Five tracks of solid lubricant 4, 5, 6, 7, 8 respectively are applied to the film of which two wider ones extend along the longitudinal edges of the film and the other three, thinner, on the two sides of the picture frames and the sound track.

Figure 10:
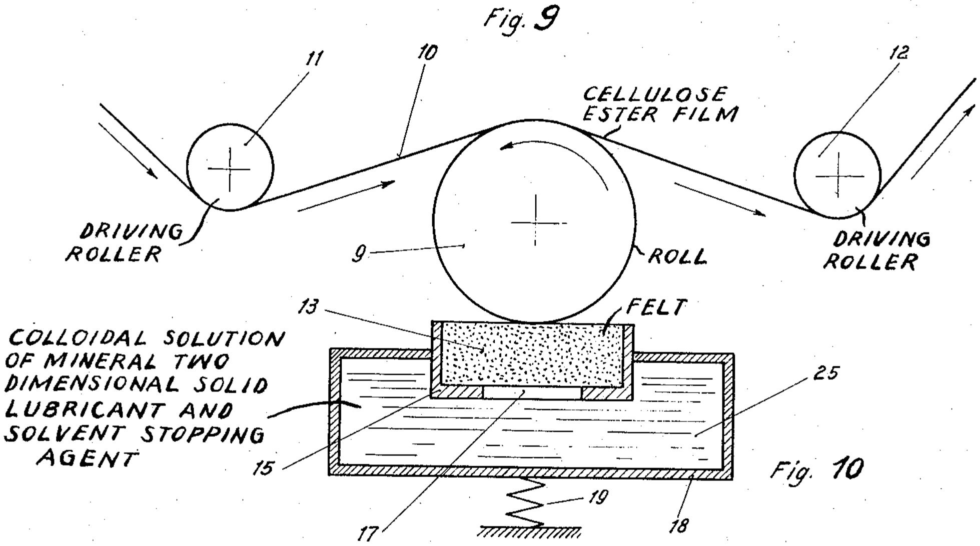
FIG. 10 shows diagramamtically a system used for applying the solid lubricant to the film of FIG. 9.
Figure 11:
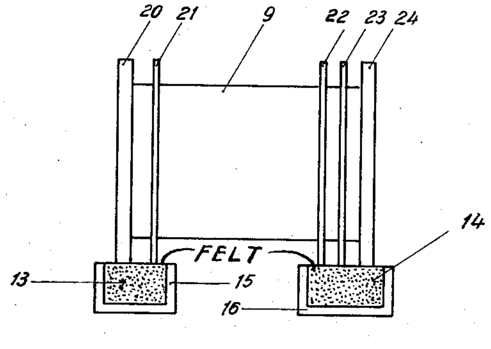
FIG. 11 shows diagrammatically a front view and partial section of a detail of the apparatus of FIG. 10.

In FIGS. 10 and 11 a roll 9 is illustrated on which a film 10 slides, in the direction indicated by the arrows. Film 10 engages with rolls 11, 12 which may be driving rollers. Roll 9 is provided with rotary motion in a direction opposite to the translation movement of the film and its speed is such that there is slip between the film and the roll. The roll slides on the diametrically opposed side on two felts 13, 14, carried by supports 15, 16, apertured at 17. Supports 15, 16, are fixed to a receptacle 18 containing a preparation 25 based on a colloidal solution of a mineral two-dimensional solid lubricant. The receptacle 18 is constantly pressed upwards, so as to keep felts 13 and 14 pressed against the lower part or roll 9, by a spring 19.

As shown in FIG. 11, roll 9 is provided with peripheral ribs 20, 21, 22, 23, 24.

Felts 13 and 14 immersed in the bath 25 absorb the preparation which is applied by friction over roll 9. The roll, in rotating, applies the solid lubricant by means of ribs 20 to 24 to corresponding strips of the film so as to prepare the tracks of solid lubricant 4 to 8 (FIG. 9). Subsequently the film is dried in known manner so as to obtain on it some strips of solid lubricant coating free from film solvent and fixed in a permanent manner to the latter.

Naturally the tracks of solid lubricant may be chosen at will both as regards their number or their width which latter are only limited by the space necessary for the picture frames and the sound track. The solid lubricant will be preferably applied to both sides of the film but could in some cases be applied to one face only.

What I claim is:

1. Method of imparting an intimately attached, protective and wear resistant layer of lubricant to predetermined areas of cellulose ester type motion picture film wherein a two-dimensional crystalline particle solid lubricant selected from the group consisting of graphite and molybdenum bisulphide is applied continuously and uniformly primarily in narrow strips to other than image and sound record bearing areas of the film from a colloidal suspension in a liquid carrier of methyl alcohol, ethyl acetate and amyl acetate having a definite swelling and blowing out effect on the material of the film, the combination with said carrier of ethyl chlorhydrine having a buffering effect on components having a solvent effect on the material of the film.

2. Method of imparting an intimately attached, protective and wear resistant layer of lubricant to predetermined areas of cellulose ester type motion picture film wherein a two-dimensional crystalline particle solid lubricant selected from the group consisting of graphite and molybdenum bisulphide is applied continuously and uniformly primarily in narrow strips to other than image and sound record bearing areas of the film from a colloidal suspension in a liquid carrier of methyl alcohol having a definite swelling and blowing out effect on the material of the film, the combination with said carrier of tetrachlorethane and ethyl chlorhydrine having a buffering effect on components having a solvent effect on the material of the film.

References Cited in the file of this patent

UNITED STATES PATENTS

| | | |
|---|---|---|
| 1,226,655 | Grosvenor | May 22, 1917 |
| 1,568,605 | Hough | Jan. 5, 1926 |
| 1,576,907 | Grover | Mar. 16, 1926 |
| 2,608,127 | Redfield | Aug. 26, 1952 |
| 2,804,401 | Cousino | Aug. 27, 1957 |